(12) United States Patent
Marshall et al.

(10) Patent No.: US 7,142,953 B2
(45) Date of Patent: Nov. 28, 2006

(54) RECONFIGURABLE DIGITAL PROCESSING SYSTEM FOR SPACE

(75) Inventors: Joseph R. Marshall, Manassas, VA (US); Alan F. Dennis, Chantilly, VA (US); Charles A. Dennis, Warrenton, VA (US); Steven G. Santee, Bristow, VA (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/672,844

(22) Filed: Sep. 25, 2003

(65) Prior Publication Data

US 2004/0148069 A1    Jul. 29, 2004

Related U.S. Application Data

(63) Continuation-in-part of application No. 10/334,317, filed on Dec. 31, 2002.

(60) Provisional application No. 60/347,670, filed on Jan. 11, 2002.

(51) Int. Cl.
*B64C 1/36* (2006.01)
(52) U.S. Cl. .............. 701/13; 701/9; 701/33; 712/1
(58) Field of Classification Search ............ 701/9, 701/13, 29, 33, 43; 700/18, 87; 712/1
See application file for complete search history.

(56) References Cited

U.S. PATENT DOCUMENTS

| | | | | |
|---|---|---|---|---|
| 5,278,906 A | * | 1/1994 | Boly et al. | 380/268 |
| 5,847,548 A | * | 12/1998 | He et al. | 323/222 |
| 5,960,191 A | | 9/1999 | Sample et al. | |
| 6,175,940 B1 | | 1/2001 | Saunders | |
| 6,462,684 B1 | | 10/2002 | Medelius et al. | |
| 2004/0064622 A1 | * | 4/2004 | Smith | 710/305 |
| 2004/0117519 A1 | * | 6/2004 | Smith | 710/22 |

* cited by examiner

*Primary Examiner*—Gertrude A. Jeanglaude
(74) *Attorney, Agent, or Firm*—Daniel J. Long; Robert K. Tendler

(57) ABSTRACT

A reconfigurable digital processing system for space includes the utilization of field programmable gate arrays utilizing a hardware centric approach to reconfigure software processors in a space vehicle through the reprogramming of multiple FPGAs such that one obtains a power/performance characteristic for signal processing tasks that cannot be achieved simply through the use of off-the-shelf processors. In one embodiment, for damaged or otherwise inoperable signal processors located on a spacecraft, the remaining processors which are undamaged can be reconfigured through changing the machine language and binary to the field programmable gate arrays to change the core processor while at the same time maintaining undamaged components so that the signal processing functions can be restored utilizing a RAM-based FPGA as a signal processor. In one embodiment, multiple FPGAs are connected together by a data bus and are also provided with data pipes which interconnect selected FPGAs together to provide the necessary processing function. Flexibility in reconfiguration includes the utilizing of a timing and synchronization block as well as a common configuration block which when coupled to an interconnect block permits reconfiguration of a customizable application core, depending on the particular signal processing function desired. The result is that damaged or inoperable signal processing components can be repaired in space without having to physically attend to the hardware by transmitting to the spacecraft commands which reconfigure the particular FPGAs thus to alter their signal processing function. Also mission changes can be accomplished by reprogramming the FPGAs.

12 Claims, 7 Drawing Sheets

RECONFIGURABLE DIGITAL PROCESSING SYSTEM FOR SPACE

CROSS REFERENCE TO RELATED APPLICATION

This is a Continuation-In-Part of U.S. application Ser. No. 10/334,317, filed Dec. 31, 2002. This application also claims rights under 35 USC § 119(e) under U.S. application Ser. No. 60/347,670, filed Jan. 11, 2002.

STATEMENT OF GOVERNMENT INTEREST

The invention described herein was made under Contract No. 572100 with the Government of the United States of America and may be manufactured and used by and for the Government of the United States of America for Governmental purposes without the payment of any royalties thereon or therefor.

FIELD OF INVENTION

This invention relates to the repair or mission redirection of space vehicle electronics and more in particularly to the utilization of field programmable gate arrays to provide a hardware centric approach to the repair or mission redirection.

BACKGROUND OF THE INVENTION

In the past decade, signal and data processing aboard spacecrafts have advanced rapidly from KIPS or kilo instructions per second to MIPS or millions of instructions per second. The result is the utilization of increasingly powerful commercial technology which has to be adapted for space applications.

However, as is common in the design of electronics carried in space vehicles, a massive amount of redundancy has heretofore been utilized such that if one of the particular processing systems goes down due to massive incoming radiation or due to component failures, it was the policy to provide for redundant processing to repair the electronics by simply duplicating it and calling up the duplicate processor.

However, with increased processing loads the amount of a weight and space occupied by such redundant systems has become excessive. Additionally, the utilization of redundant systems requires increased power resources which are unavailable at the spacecraft. Thus there is a limit of how much redundancy one can achieve given the limited space and power resources available on, for instance, a communications satellite.

Moreover, due to the long time span of missions lasting from several years to over decades, the applications for the processing elements for the spacecraft sometimes needs to be changed due to different requirements that did not exist at the time of launch. This means that there is a requirement to be able to flexibly change the signal processing capabilities of the on-board electronics package and to do so not only to accommodate system element failure, but also to accommodate new mission objectives.

In the early days of space flight in the United States, triple redundancy was thought to be sufficient to counteract system failures during the relatively short space flights involved. For instance, in manned programs, the missions were at most a number of weeks as opposed to number of decades. Thus for manned space flight, triple redundancy was sufficient due to the relatively short duration of the space flight.

However, for longer missions involving multiple years to decades, not only was it necessary to be able to accommodate subsystem failures, it was necessary to be able to repair the downed subsystems without costly individual element redundancy. For mission changes individual element redundancy was likewise inappropriate.

Thus, with decade long missions, and with power at a premium, to say nothing of payload weight, there is a requirement for providing a fundamentally different methodology for accommodating system failure and mission changes.

SUMMARY OF THE INVENTION

In the subject invention, a multi processor network architecture is utilized which is composed of a group of hardware and software building blocks supported by tests and development environments that are combined utilizing well defined interfaces to perform general purpose processing, and more particularly signal processing. As part and parcel of the subject invention some or all of the spacecraft processing is provided by field programmable gate arrays. The reconfigurable nature of the subject invention derives from the utilization of the field programmable gate arrays usable in a space environment which today may have as many as one million gates in a module. As a result, in the subject invention, the multi processor network is built up from a number of hardware building blocks one or more of which being one or more field programmable gate arrays. To make the blocks most useful, an infrastructure is created around the fixed elements (such as external I/O connections to the board) of the FPGA array. This is fully tested and provides a mission configurable attachment to the unique processing in each FPGA.

In one embodiment, an array of field programmable gate arrays (FPGAs) is provided and interconnected with a bus structure, and with data pipes being provided to interconnect various field programmable gate arrays and to the outside world.

Moreover, for the FPGA infrastructure a timing and synchronization block is utilized to synchronize the various data pipes to the clock or clocks of interest, whereas a set of common infrastructure block registers is utilized to configure the fixed interconnects into and out of the FPGA as well as to provide the status of both the fixed elements and as a collector of status from the customizable application core involved in the FPGA digital signal processor. Shadowed data ports are provided to synchronize data pipes from other FPGAs to the same clock or clocks so that all the data can be worked on in parallel by the various FPGAs. Thus the shadowing concept involves the idea of making sure that all of the FPGAs have the requisite data for their particular processing functions or that one FPGA can provide output data to any of the externally connected types of devices or to the other FPGAs.

The shadowing is utilized for flexibility purposes and also due to limitations on external signals where they can only be connected to one FPGA.

Thus, rather than simply uploading new software for software modules on-board the spacecraft, what is uploaded to the spacecraft are commands involving messages which reconfigure the basic signal-processing components utilized. What this means is that the instruction set for the FPGAs can be changed on the fly in terms of changing the machine language and the binary so that the original or new hardware processing function is defined, thus to be able to reconfigure or create a new signal processor where one has previously damaged or where the mission task has changed requiring different types of signal processing.

In one embodiment, a circuit is provided for periodically monitoring the health of a FPGA and if found defective, this fact is transmitted to an earth station to alert engineers and scientists to the fact that a problem exists. When a solution is engineered the appropriate FPGA change is uploaded to the spacecraft to correct the problem. Alternatively, upon detection of such an event, other processors on the spacecraft can be programmed to reconfigure damaged processors.

The result is that it is no longer necessary, if it were at all possible to switch out unique processors on a spacecraft in the same manner that shuttle-reachable low earth orbit satellite processors can be changed through utilizing the space shuttle. Rather the field programmable gate array modules supply sufficient on-board hardware to provide for the aforementioned redundancy by simply creating a new signal processor through the reconfiguration of an operational FPGA.

To provide for programming flexibility, either for repair or to accommodate mission change, a RAM-based FPGA is used as a space-based signal processor, with the RAM-based portion providing that the FPGA have a volatile memory. Moreover, since field programmable gate arrays are presently massive and are likely be even more massive, all of the potentially increased processing power that would be required on a spacecraft may be provided by an array or multiplicity of FPGAs so that even with the increased processing requirements for todays missions, reconfigurable hardware may be provided.

In summary, a reconfigurable digital processing system for space includes the utilization of field programmable gate arrays utilizing a hardware centric approach to reconfigure software processors in a space vehicle through the reprogramming one or more FPGAs such that one obtains a power/performance characteristic for signal processing tasks that can not be achieved simply through the use of off-the-shelf processors. In one embodiment, for damaged or otherwise inoperable signal processors located on a spacecraft, the remaining processors which are undamaged can be reconfigured through changing the machine language and binary to the field programmable gate arrays to change the core processor while at the same time maintaining undamaged components so that the signal processing functions can be restored utilizing a RAM based FPGA. In one embodiment, multiple FPGAs are connected together by a data bus and are also provided with data pipes which interconnect selected FPGAs together to provide the necessary processing function or functions. Flexibility in reconfiguration includes the utilizing of a specialized timing and synchronization block as well as a common configuration block which when coupled to an interconnect block permits reconfiguration of a customizable application core, depending on the particular signal processing function desired. The result is that damaged or inoperable signal processing components can be repaired in space without having to physically attend to the hardware by transmitting to the spacecraft commands which reconfigure the particular FPGAs thus to alter their signal processing function. Whether or not damaged, the same system can be used mid-flight to reconfigure processors for new mission tasks.

BRIEF DESCRIPTION OF THE DRAWINGS

These and other features of the subject invention will be better understood in connection with the Detailed Description in conjunction with the Drawings, of which:

FIG. 6 is a block diagram of the FPGA infrastructure of FIG. 5, illustrating the change in the customizable application core to a histogram function involving a change in the processing performed by the core as well as the requirement for an expanded memory to be able to store histogram data and to output it through the external I/O block; and, FIG. 7 is a block diagram of a field programmable gate array module involving a number of field programmable arrays and the control on the interface thereof back to.

DETAILED DESCRIPTION

Figure 1:
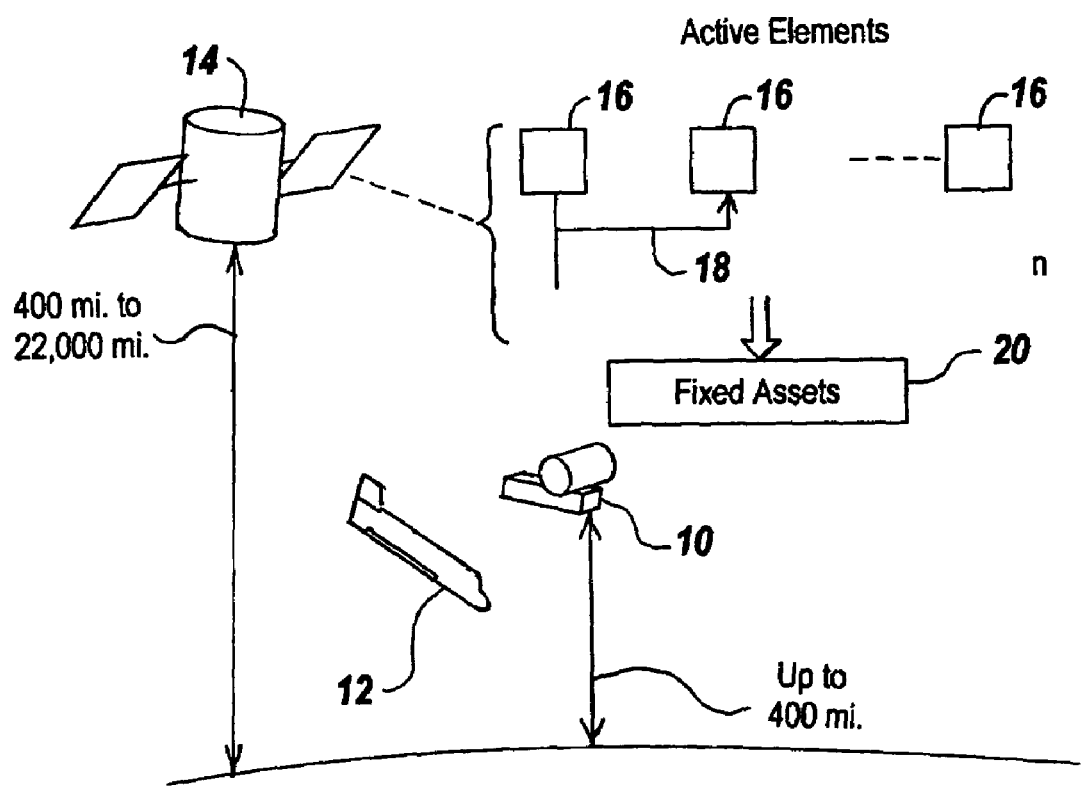
FIG. 1 is a diagrammatic illustration of the utilization of redundancy to effectuate repair of satellites or spacecraft which can not be reached by a manned space vehicle, illustrating the problem of the repair of space vehicles which are not in low earth orbit.

Referring now to FIG. 1, in the prior art, a low earth orbit spacecraft such as illustrated at 10 could be serviced by a space shuttle 12 such that for any malfunctioning equipment or any change in mission task equipment could be removed, repaired and re-installed. Such was the case with the Hubbel space telescope. However, for those spacecraft above the shuttle's reach such as geosyncronous satellites 14 it is impossible to do a manned repair for any equipment that may be malfunctioning.

It will be appreciated that such satellites may be on station multiple years to decades and that the electronic circuits within the satellite may simply deteriorate with age or may be damaged by a burst or the build-up of radiation. In order to assure that such failures could be remedied, the number of active unique elements in the spacecraft electronics were duplicated for redundancy purposes such as illustrated at 16, such that whatever functions the active elements were to perform, if one of the unique elements went down, the functions were then switched to a redundant identical unique element such as illustrated by arrow 18.

As mentioned hereinbefore, with the monumental increase in processing power for signal processing aboard the satellites, it then became imperative to find some way of resurrecting the function of a failed signal processor or some other element aboard such a satellite.

In the past, the resurrection would mean merely switching from one previously programmed active element to an identical active element and to couple it to a fixed asset such as on antenna and the like here illustrated at 20 in order to make sure the function of the satellite was restored.

However, for missions that last over multiple years to decades, not only may the individual electrical components fail, the mission tasks may change and it is for this reason that it is important to provide a certain amount of reconfigurable flexibility in order to accommodate both scenarios.

Rather than simply reprogramming existing processors, in the subject invention the flexibility is provided by reconfigurable field programmable gate arrays, each which presently can have as many one million separate gates.

While the subject invention will be concerned with present day field programmable gate arrays that are qualified for space usage, it will be appreciated that with new technical advances, the number of gates per square inch is already increasing in terrestrial applications and may become space qualified in the future.

Figure 2:
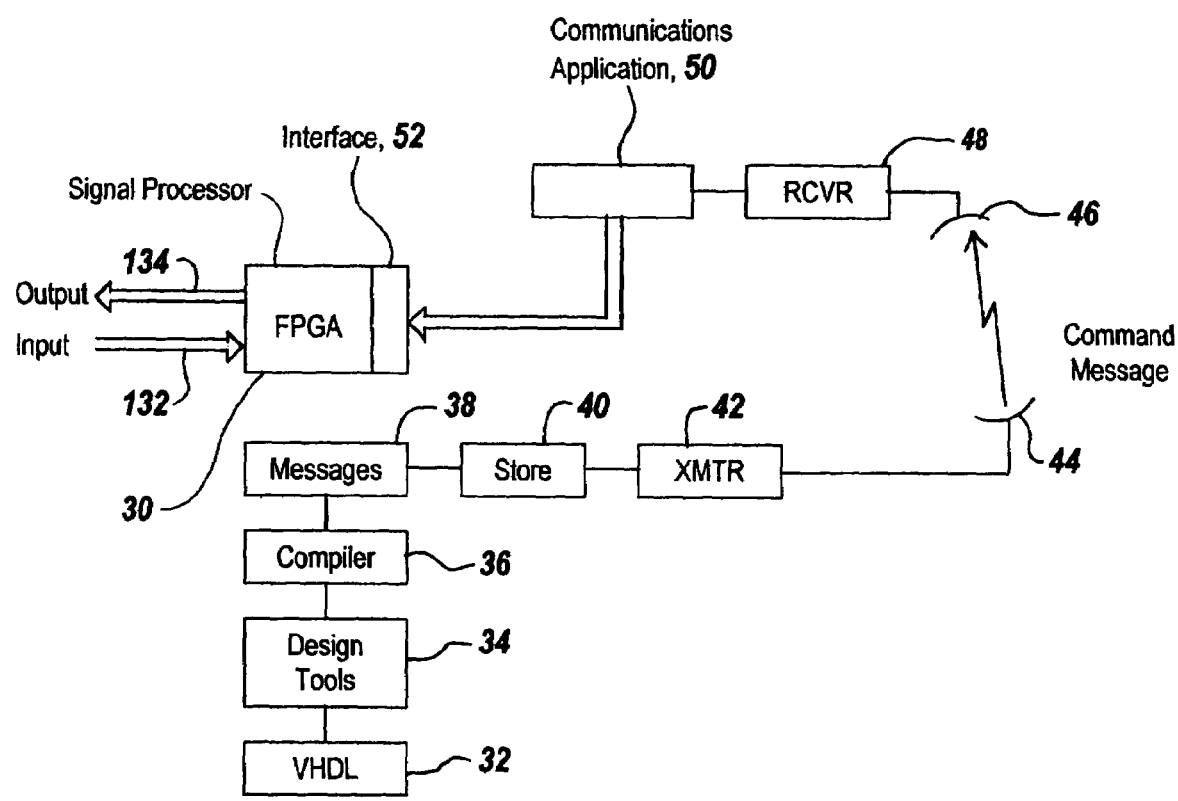
FIG. 2 is a block diagram illustrating the utilization of a field programmable gate array which is reconfigurable from the ground through the transmission of compiled messages which are stored and transmitted via commands to an on-board spacecraft receiver which through a communications application and an interface reprograms a spacecraft-carried FPGAs.

Referring now to FIG. 2, in order to provide a reconfigurable digital processing system for space applications, the signal processing function in the subject invention is provided through one or a number of field programmable gate arrays 30 in which an input signal 132 of a digital nature is processed by the field programmable gate array so as to provide an output 134, with the output depending on the particular signal processing function. These signal processing functions can be as simple as a filter function, or as complicated as a fast Fourier transform device. Moreover, the field programmable gate array can provide a histogram type function in which incoming data is categorized over time so that the particular signature or time history of an event is cataloged as to the number of occurrences. This is utilized for, for instance, for signal recognition purposes. For telemetry or sparse data collection, for instance, a number of compression algorithms are implemented in the spacecraft's electronics so as to be able to provide compressed data transmissions to earth stations or between satellites, with the compression algorithms providing the information in a compressed form so as to reduce the amount of data transmitted. Moreover, when the satellites are utilized, for instance for reconnaissance purposes, a number of co-band interfering signals can be analyzed, separated, demodulated and the information provided in a downlink to an earth station. This type of processing can involve multi-user detection algorithms and can involve complicated Viturbi processing, all of which requires increased processing power.

In fact, any signal analysis which is performed by the electronics payload of the satellite requires the use of computers and therefore requires the ability to be able to do the particular processing task even when some of the active elements are down due to malfunction.

Moreover, if the signal-processing task varies, in the subject invention it is the purpose of the use of the field programmable gate arrays to provide a hardware centric approach to digital signal processing so that for new mission tasks the basic functioning of the processor is altered in terms of altering the configuration of the field programmable gate array.

In order to upload commands or messages which will reconfigure the field programmable gate array, in general the function of the field programmable gate array is written or generated in VHDL as illustrated at 32 which with design tool 34 and a compiler 36 are utilized to generate messages 38 that are stored at 40 and then transmitted at 42 via an antenna 44 to a spacecraft antenna 46. These messages in the form of commands are received by a receiver 48 on the spacecraft which are then provided to a communication application 50 which provides the commands in a form suitable for reprogramming or reconfiguring in a field programmable gate array 30. This is done through an interface 52 as illustrated.

Figure 3:
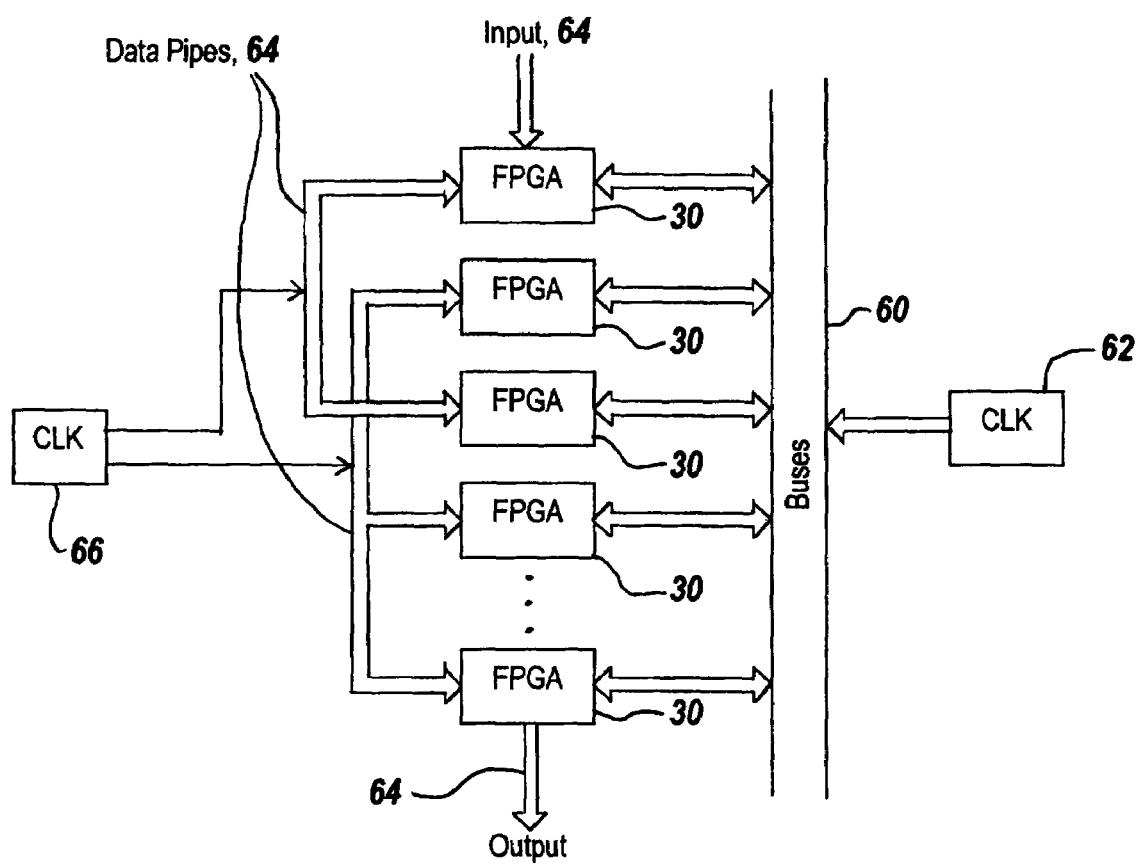
FIG. 3 is a diagrammatic illustration of the utilization of an array of FPGAs interconnected with a bus and data pipes so as to provide a spacecraft with reconfigurable signal and data processors.

Referring now to FIG. 3, in the subject invention for spacecraft applications, a number of field programmable gate arrays 30 are provided as the essential reconfigurable digital processing elements. In order to be able to reconfigure the field programmable gate arrays, one or more busses 60 are provided which provides configuration instructions as well as timing, along with low speed data for inputting and outputting data not subject to major timing constraints. It will be appreciated that any bus has an associated clock 62 which represents one of a number of clocks that may be utilized in this subsystem.

Also interconnecting the field programmable gate arrays are a number of data pipes 64. These data pipes have their own clocking system 66 that provide the time base and clock signals for moving and operating on the data between and in the FPGAs. These data pipes 64 provide data inputs and data outputs for each of the field programmable gate arrays. These data pipes also provide a shadowing technique for synchronizing the data between multiple FPGAs. By shadowing is meant the provision of a data bus to present the same data at the same time (on the same clock pulse or on a clock pulse that is a deterministic number of clocks from the main clock) to multiple field programmable gate arrays. Shadowing also provides the ability to output data from any FPGA to a specific output port of another FPGA that is also time synchronized to a specific clock pulse.

It will also be appreciated that selected ones of the FPGAs may be required to communicate with the outside world, meaning other electronics components within the spacecraft. Data pipe 64 also provides such a function. Thus, the data pipes may provide interconnectability between the FPGAs and also serve as a means of inputting data as well as outputting data.

Figure 4:
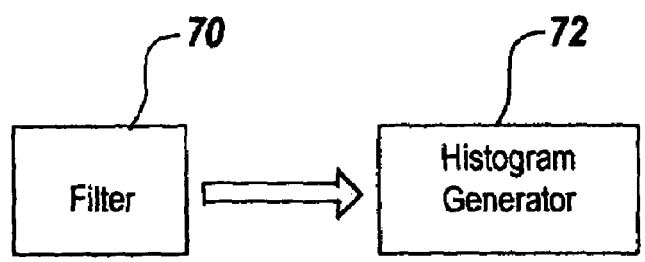
FIG. 4 is a diagrammatic illustration of the change of a filter function of an FPGA digital signal processor to a histogram generating function.

Referring now to FIG. 4, in one illustrative embodiment, it may be required that a filtering process such as illustrated at 70 for a given FPGA array be converted into a histogram generating function as illustrated at 72. When formulating the original mission, it may have been unrecognized that histograms would be required and it is up to the system designers to be able to garner whatever assets are on-board the spacecraft in order to be able to perform the histogram function.

As part of the subject invention, since field programmable gate arrays are used as a processing element for the signal processing in the spacecraft, a filter function for a given FPGA is to be converted into a histogram generating function. While this scenario is for illustrative purposes only, it will be appreciated that for malfunctioning apparatus a given FPGA, if operational, may be reconfigured to perform the signal-processing task of an inoperative FPGA or an inoperable component on the spacecraft.

Figure 5:
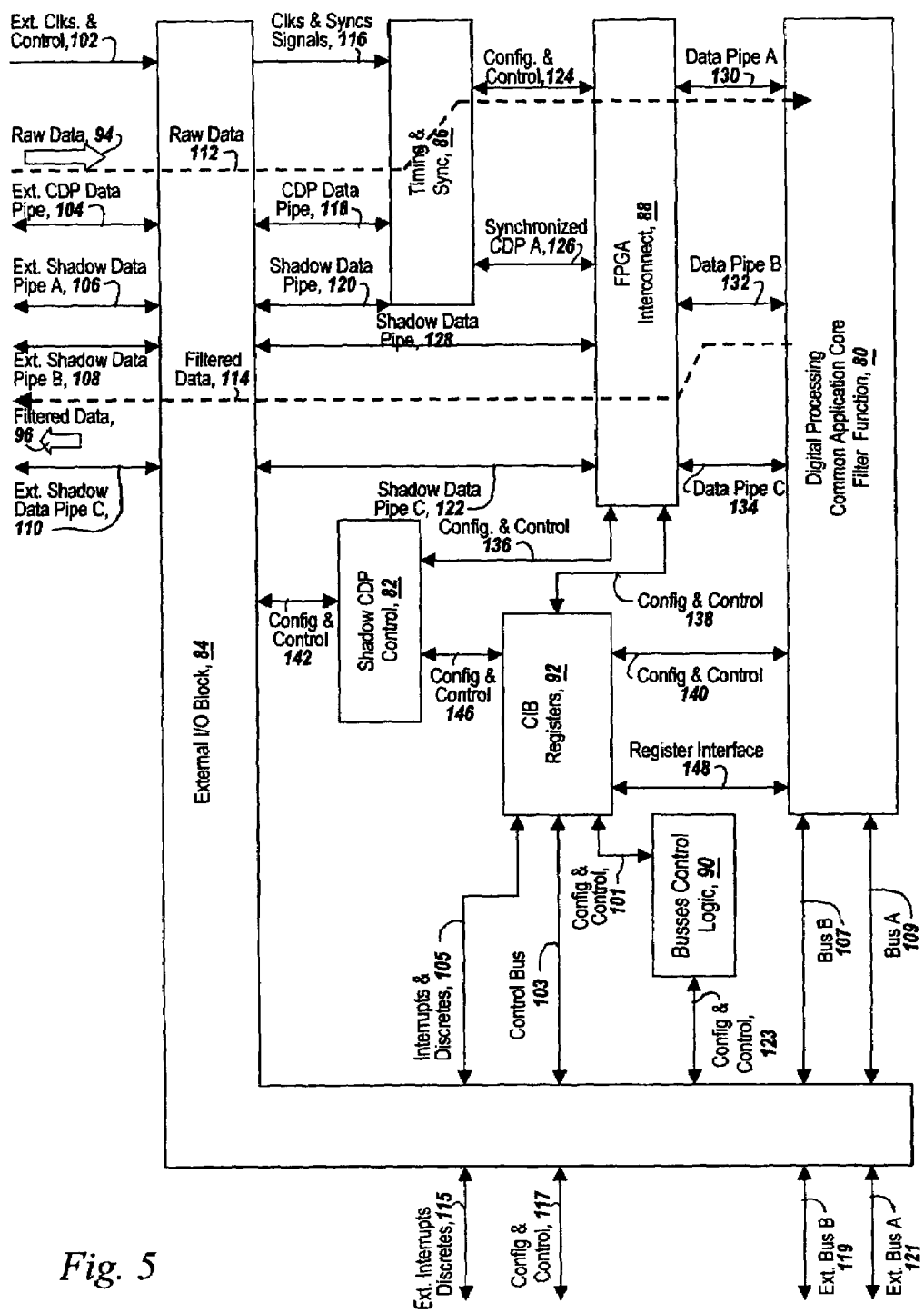
FIG. 5 is a block diagram of the subject FPGA infrastructure involving a customizable application core which is configured in one instance to provide a filter function in which raw data to be filtered is routed to the customizable application core via data pipes, with the filtered output routed out via data pipes through an external I/O block.

Referring now to FIG. 5, it will now be demonstrated how the FPGA infrastructure can be utilized in the first instance to provide a filter function.

Referring now to FIG. 5, as can be seen at 80, a customizable application core which utilizes in general 95% or more of the FPGA capacity, provides a digital signal processing functioning and is pre-encoded to provide a preselected filter function. Raw data to be filtered as illustrated by arrow 94 is introduced into the FPGA via external CDP input data pipe 104 through an external I/O block 84 over internal data pipe 118 which then through a timing and synchronization block 86 provides this information via a synchronized data pipe 126 to and through an interconnect block 88 and over a data pipe 130 to core 80. The flow of data is illustrated by dotted line 112, with the timing and synchronization block synchronizing the data in time with the controlling clock and thus with the filter function. It will be appreciated that the purpose of interconnect block 88 is to function as a switch to be able to connect appropriate data pipes to and from core 80 to and from external I/O block 84. In this case, the raw digital data to be filtered is applied over data pipe 130, with the result of the processing accomplished by the core being applied to data pipe 132 which is connected through interconnect 88 over shadow CDP data pipe 128 to external I/O block 84 from which the filtered data 96 is available over shadow data pipe B 108. This output filter data path is shown by dotted line 114.

Further, regarding the control of the field programmable gate array, a configuration and status block 92 has within it common infrastructure block registers which store configuration and status information, with the common infrastructure configuration and status block being connected to external I/O block 84 to receive and transmit data over control bus 103, and to timing and synchronization block 86 utilizing connected clocks 144, interconnect block 88 controlled over configuration and control interface 138, and core 80 through register interface 148 and controlled over configuration and control interface 140.

Configuration and status block 92 also provides interrupt and discretes 105 which are coupled to the external I/O block 84, the purpose of which is to signal events and status of the FPGA function to external apparatus such as illustrated by arrow 115. Block 92 is also configured to receive as well as transmit this information. It will be appreciated that this information comes from a source external from the FPGA to control the FPGA infrastructure or can be generated by the FPGA infrastructure for use externally. It will be appreciated that the external I/O block 84 is indeed the boundary of the control for the FPGA, with the control bus connection being illustrated at 103 between external I/O block 84 and configuration and status block 92.

It will be noted that as illustrated at 90 control logic is generated for bus A and B illustrated at 107 and 109 respectively and control bus illustrated at 103, connected between core 80 or CIB Registers 92 and external I/O block 84. It will be appreciated that bus A, bus B and Control Bus connect to the outside world through external I/O block 84 as illustrated and correspond to the connections between FPGAs 30 of FIG. 3 and bus 60.

As to the aforementioned shadowing, there is a shadow bus control 82 which is connected between external I/O block 84 and configuration and status block 92 with control provided over configuration and control interface 146 as illustrated. Also shown are three shadows 120, 128 and 122 which are connected between the external I/O block 84 and interconnect block 88 or the timing and synchronization block 86 as shown so as to provide time synchronized data pipes from and to external sources which as illustrated in FIG. 3 are other FPGAs. Note that while a status and clock control from external I/O block 84 is illustrated going into shadow bus control 82, as illustrated at 142 a line from the shadow bus control 92 goes to external I/O block 84 to gate and control the connection between the interconnect block and the outside world through the external I/O block.

Figure 6:
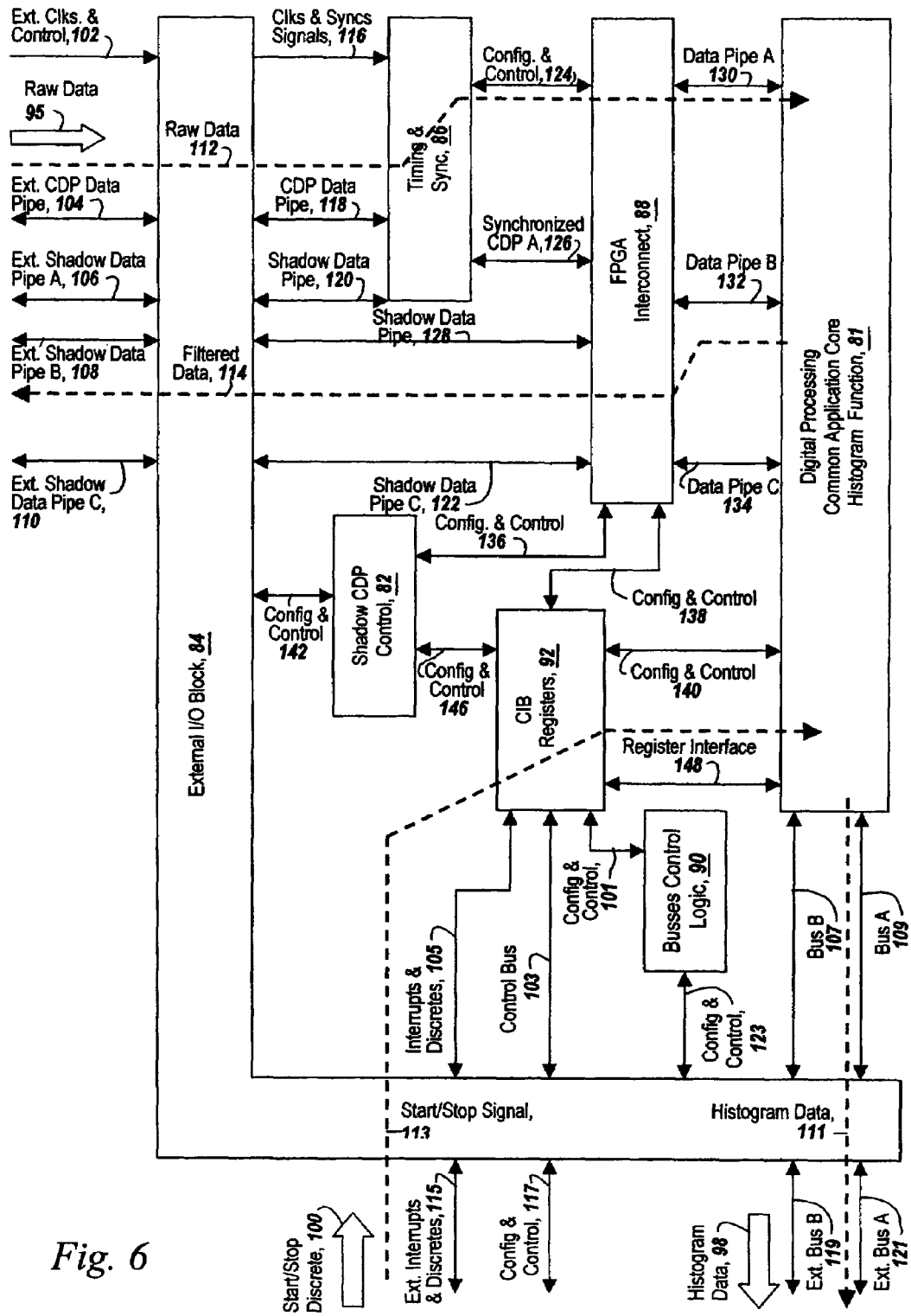

Referring now to FIG. 6, in which like reference characters are applied to like elements, in converting the particular FPGA from a filter function to a histogram generating function, the customizable application core 81 is reconfigured to perform histogram processing along with expanding the memory thereof to be able to store histogram data and the histogram results. Thus, it is important to be able to reconfigure core 81 both as to the particular type of processing it is to do as well as to add or subtract memory depending on the requirements of the particular signal processing task. It will be appreciated that memory is of course integral to the field programmable gate array, with the amount of it being prebuilt-in and utilized as required.

As can be seen in FIG. 6, histogram data 95 is applied through a data pipe to external I/O block 84 which as can be seen by dotted arrow 112 moves up through timing and synchronization block 86 and through interconnect block 88 to core 80 through the utilization of data pipes 104, 118, 126 and 130. Rather than dumping the results of the histogram generation back through interconnect block 88 and down to external I/O block 84 through timing and synchronization block 86, in this embodiment, the output of the histogram function is transmitted over bus B, here illustrated at 107 and through external I/O block 84 such that the histogram result is available as illustrated at 98. Note that in this embodiment this function is controlled by a stop, start signal 100 as opposed to being continuous as in a filter function. This start, stop function is generated externally and is applied through configuration and status block 92 utilizing the internal interrupts and discretes lines 105, external interrupts and discretes 115 and register interface 148 to appropriately control core 80 through the utilization of an internal control interface 140 as illustrated. Here the flow of data is illustrated by dotted line 113.

As can be seen at 148 a line connects infrastructure block registers to registers within core 80. Alternatively this line can dump the information in registers in core 80 back to the common infrastructure block registers in block 92.

What can be seen is that the field programmable gate array infrastructure is sufficiently flexible to convert a field programmable gate array function from one of a filtering function to one of a histogram generating function; and to do so via command from an earth station so that the required reconfiguration flexibility is achieved.

Figure 7:
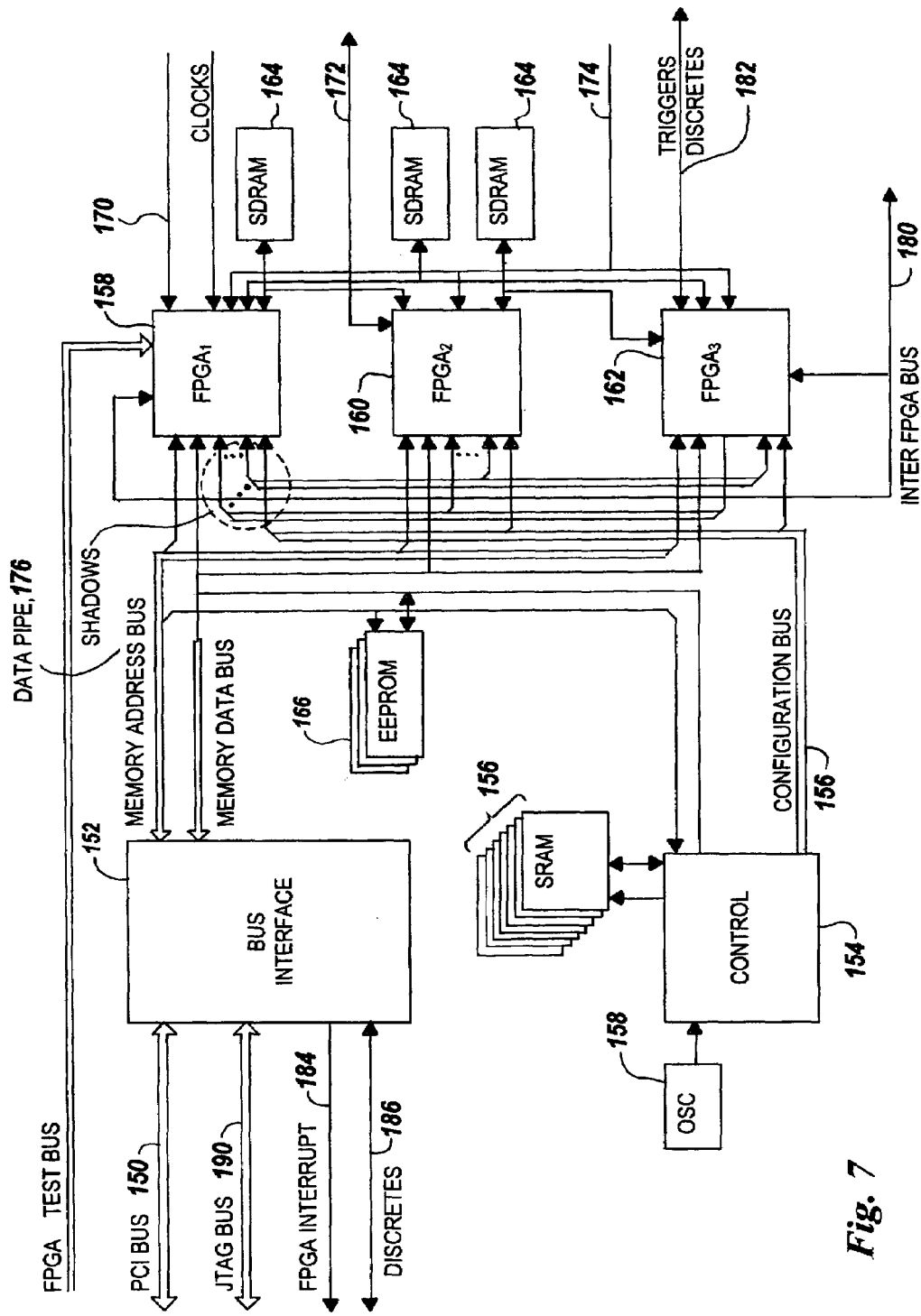

Referring now to FIG. 7, in order to reconfigure a computing card containing a number of field programmable gate arrays, configuration information is received on bus 150 which is received by bus interface 152 that in turn routes it to a control unit 154 which stores the incoming information in a series of SRAMs 156. This control has its own oscillator or clock 158, with the output of control 154 being applied to a configuration bus 156 to configure or reconfigure field programmable gate arrays 158, 160 and 162. It will be appreciated that the control unit 154 either can provide control for all three field programmable gate arrays in parallel or can individually configure a field programmable gate array.

It will be appreciated that the field programmable gate arrays can be expanded with Memory such as illustrated at 164 should there be insufficient memory in any one of the field programmable gate arrays. Note that these SDRAM can be used either between each of the field programmable gate arrays or individually.

In one embodiment, bus interface 152 is provided with an internal microcontroller (not shown) to configure the card function externally at startup. In order to be able to store the startup configuration a non-volatile memory 166 in the form of an EEPROM is provided for this purpose. As shown each of the FPGAs 158–162 are provided with their own individual data pipes 170–174 which are the external data connections for the FPGAs. Shadow data pipes 176 indicate that they can be used to shadow data pipes for the connection of one FPGA to another. Thus, in one embodiment each one of the three data pipes 170, 172 and 174 is connected individually to every other FPGA on the card through the utilization of the shadow data pipes.

Note that an interconnect bus 180 adds additional conductivity between the FPGAs for future application use and normally connects most signals between the FPGAs.

Note also that on line 182 carries triggers and discretes which are applied to the timing and synchronization block 86 as illustrated in FIG. 5 for each of the field programmable gate arrays, thus providing shadow synchronization. Note also as illustrated at 184 and 186 interrupts and discretes respectively are connected to and from the configuration and status block 100 of FIG. 5 in the case of FIG. 7. This means that FPGA interrupts on 184 are connected externally through bus interface 152 and represents the collection of those signals from control 154 and all of the FPGAs on the card. The same applies for the discretes on line 186.

With respect to single event handling in the FPGA, it will be appreciated that what is referred to as a single event is a change of state in the FPGA caused by radiation, which change is not permanent. The result is that this change can be in fact corrected. For this purpose FIG. 7's control unit 154 constantly polls the configuration of all the FPGAs to ascertain that they match the predetermined configuration stored in memory 156. In this manner the system self-tests all of its FPGAs to ascertain if there is a single event upset. Upon detection of a single event upset, control unit 154 reloads the segment of a configuration determined to be in error and notifies an external device using the interrupt structure to indicate that a single event upset has occurred. Once control unit 154 ascertains that the problem has been fixed which it does by rechecking the configuration of the associated FPGA, control unit 154 returns to its monitoring status and notifies the external element with another interrupt. The notification process allows ground controllers or other processes to be able to decide what to do about the single event upset and whether to use the data that was produced during this time period.

Note that a JTAG bus meeting the IEEE 1149.1a standard 190 is connected to bus interface 152 for test and maintenance purposes.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A reconfigurable digital processing system for use in space to permit remote reconfiguration of a space vehicle-born processor, comprising:
   a field programmable gate array functioning as a signal processor for performing a signal processing task aboard said space vehicle;
   a receiver on said space vehicle for reviewing uploaded commands for reconfiguring said field programmable gate array; and,
   a field programmable gate array configuring unit coupled to said receiver for reconfiguring said field programmable gate array responsive to said uploaded commands, whereby a field programmable gate array aboard said space vehicle can be reconfigured from a remote location.

2. The reconfigurable digital processing system of claim 1, wherein said field programmable gate array includes a testing unit for ascertaining if the operation of said field programmable gate array matches that of a prior configuration, and further including a reconfiguration unit for restoring the priorly configured operation of said field programmable gate array responsive to an output of said testing unit indicating a repairable malfunction of said field programmable gate array.

3. The reconfigurable digital processing system of claim 1, and further including a number of field programmable gate arrays and a shadowing for providing inputs to each of said gate arrays to permit parallel processing by said field programmable gate arrays.

4. The reconfigurable digital processing syscem of claim 1, wherein said field programmable gate array includes a bus and at least one data pipe coupled thereto.

5. The reconfigurable digital processing system of claim 4, wherein said bus and said data pipe includes a clock coupled thereto.

6. The reconfigurable digital processing system of claim 1, wherein said field programmable gate array includes a customizable core, an interconnect block coupled to said core, a timing and synchronization unit connected to said interconnect block, an external I/O block coupled to said timing and synchronization unit, the coupling of said interconnect block and said core including at least one data pipe, the coupling of said external I/O block and said timing and synchronization unit including at least one data pipe.

7. The reconfigurable digital processing system of claim 6, wherein said field programmable gate array includes a common configuration and status unit coupled to said external I/O block and to said core to provide internal interface control thereof.

8. The reconfiguration digital processing system of claim 7, and further including control logic for providing a time stamp to said configuration and status common configuration and status unit.

9. The reconfigurable digital processing system of claim 8, and further including at least one bus coupled between said core and said external I/O block, said control logic coupled to said external I/O block for control of the timing of the signals on said bus.

10. The reconfigurable digital processing of claim 9, and further including a shadow bus control unit coupled between said external I/O block and said common infrastructure configuration and status unit for the control of shadow functions.

11. A reconfigurable digital processing system, comprising:
    a card having a number of field programmable gate arrays thereon;
    a control unit for controlling the configuration of said field programmable gate arrays;
    a configuration bus coupled between said control unit and said field programmable gate arrays;
    a bus interface coupled to said field programmable gate arrays; and,
    a shadow interconnect between said field programmable gate arrays for connecting said arrays together to perform parallel processing tasks.

12. The systom of claim 11, and further including SRAM storage for said control unit and EEPROM storage for memory and address data from said bus interface.

* * * * *